US011193243B2

(12) United States Patent
Chesky

(10) Patent No.: US 11,193,243 B2
(45) Date of Patent: Dec. 7, 2021

(54) AGRICULTURAL OIL-BASED SEALING AND PRESERVATION AGENT AND METHOD OF TREATING ASPHALT CONSTRUCTION OR PAVEMENT

(71) Applicant: BIOSPAN TECHNOLOGIES, INC., Ballwin, MO (US)

(72) Inventor: Sheldon R Chesky, Chesterfield, MO (US)

(73) Assignee: BIOSPAN TECHNOLOGIES, INC., Ballwin, MO (US)

(*) Notice: Subject to any disclaimer, the term of this patent is extended or adjusted under 35 U.S.C. 154(b) by 12 days.

(21) Appl. No.: 16/683,431

(22) Filed: Nov. 14, 2019

(65) Prior Publication Data

US 2020/0149227 A1 May 14, 2020

Related U.S. Application Data

(60) Provisional application No. 62/767,195, filed on Nov. 14, 2018.

(51) Int. Cl.

| | | |
|---|---|---|
| E01C 7/35 | (2006.01) | |
| E01C 11/00 | (2006.01) | |
| C09D 7/63 | (2018.01) | |
| C09D 7/61 | (2018.01) | |
| C09D 125/06 | (2006.01) | |
| C09D 109/06 | (2006.01) | |

(52) U.S. Cl.
CPC ............... *E01C 7/356* (2013.01); *C09D 7/61* (2018.01); *C09D 7/63* (2018.01); *C09D 109/06* (2013.01); *C09D 125/06* (2013.01); *E01C 7/351* (2013.01); *E01C 7/358* (2013.01); *E01C 11/005* (2013.01)

(58) Field of Classification Search
None
See application file for complete search history.

(56) References Cited

U.S. PATENT DOCUMENTS

| 2,310,972 A | 2/1943 | Livermore et al. ........... 523/336 |
|---|---|---|
| 2,700,655 A | 1/1955 | Endres et al. ................. 524/71 |
| 2,871,212 A | 1/1959 | Thayer .......................... 524/59 |
| 3,049,836 A | 8/1962 | Eugene ......................... 206/582 |
| 3,253,521 A | 5/1966 | Endres ............................ 404/73 |
| 3,270,631 A | 9/1966 | Bower ......................... 427/138 |
| 3,338,849 A | 8/1967 | Johnson ......................... 524/68 |
| 3,340,780 A | 9/1967 | Roediger ........................ 404/31 |
| 3,374,104 A | 3/1968 | Baum et al. ............... 106/273.1 |
| 3,821,144 A | 6/1974 | Yer et al. ........................ 524/69 |
| 3,879,323 A | 4/1975 | Van Der Loos ............... 524/62 |
| 4,105,612 A | 8/1978 | Cushman et al. .............. 524/62 |
| 4,485,201 A | 11/1984 | Davis .............................. 524/68 |
| 4,868,233 A | 9/1989 | Moran ........................... 524/71 |
| 5,322,867 A | 6/1994 | Kluttz ............................ 524/68 |
| 5,436,285 A | 7/1995 | Causyn et al. .................. 524/68 |
| 5,451,621 A | 9/1995 | Usmani et al. ................. 524/68 |
| 5,473,000 A | 12/1995 | Pinomaa ........................ 524/59 |
| 5,556,900 A | 9/1996 | Goodrich et al. .............. 524/59 |
| 5,704,971 A | 1/1998 | Memon ....................... 106/281.1 |
| 5,811,477 A | 9/1998 | Burris et al. ................... 524/60 |
| 5,973,037 A | 10/1999 | Fields ............................ 524/60 |
| 2004/0025745 A1* | 2/2004 | Freisthler ................ E01C 7/187 |
| | | 106/266 |
| 2010/0163068 A1 | 7/2010 | Kergosien et al. ............. 424/61 |
| 2017/0204267 A1 | 7/2017 | Ferguson et al. .......... 106/273.1 |

FOREIGN PATENT DOCUMENTS

| AU | 7172574 | | 1/1976 |
|---|---|---|---|
| CA | 2790267 | | 4/2013 |
| JP | 10219118 A | * | 8/1998 |

OTHER PUBLICATIONS

PCT International Search Report of International Application No. PCT/US2019/061414 dated Jan. 23, 2020.

* cited by examiner

*Primary Examiner* — Jose I Hernandez-Kenney
(74) *Attorney, Agent, or Firm* — Medlen & Carroll, LLP

(57) ABSTRACT

This invention is in the field of asphalt construction or pavement applications, compositions and methods of use thereof. The invention also relates to methods of asphalt treatment, such as a step of applying onto an asphalt surface, under treatment conditions, a composition containing a biobased ester, at least one monoterpene, propylene glycol methyl ether acetate, a liquid intermediate made from polystyrene foam, sulfuric acid, D-limonene and soy methyl ester; carbon black pigment and styrene-butadiene complex.

17 Claims, No Drawings

AGRICULTURAL OIL-BASED SEALING AND PRESERVATION AGENT AND METHOD OF TREATING ASPHALT CONSTRUCTION OR PAVEMENT

CROSS-REFERENCE TO RELATED APPLICATIONS

The present application claims the benefit of U.S. Provisional Patent Application No. 62/767,195, filed on Nov. 14, 2018, which is incorporated herein by reference.

FIELD OF THE INVENTION

This invention is in the field of asphalt construction or pavement applications, compositions and methods of use thereof. The invention also relates to methods of using the composition to surface seal and as a penetrating preservation agent to extend the life of the asphalt construction or pavement. The present invention relates to asphalt repair compositions, sealing or coating compositions, and methods for coating structures such as roadways, such as asphaltic surfaces to improve structure lifetime.

BACKGROUND OF THE INVENTION

Asphalt is widely used in the construction of highways and parking areas where large areas need to be covered with a relatively hard, flat, weather-resistant surface suitable for vehicular travel. With prolonged usage these asphalt surfaces develop cracks which permit the seepage of water therethrough to undermine the sand and rock subbase. Asphalt pavement includes a light oil that functions as a binder with the aggregate contained within the asphalt. The sun, as well as the amount of vehicular travel, causes this light oil to vaporize thereby causing the asphalt roadway to deteriorate. This deterioration of the asphalt surface necessitates reconditioning of that surface. Therefore there is a need for a need for a method and composition to surface seal and as a penetrating preservation agent to extend the life of the asphalt construction or pavement. What is needed is a method of resurfacing or improving the asphalt surface without physical removal of the asphalt or application of additional roadway layers.

SUMMARY OF THE INVENTION

The present invention, in one embodiment, contemplates compositions and methods for enhancing the operational life of asphalt surfaces, and in particular, asphalt surfaces that have oxidized. In one embodiment, the invention relates to a method of treating an asphalt from a solid surface comprising: a) providing; i) a solid surface comprising asphalt thereon; and ii) a mixture comprising at least one biobased ester, at least one monoterpene, propylene glycol methyl ether acetate, a liquid intermediate made from polystyrene foam, carbon black pigment, and styrene-butadiene complex; and b) applying said mixture to said surface under conditions such that said asphalt is treated. In one embodiment, the mixture is a nonaqueous mixture. In one embodiment, said asphalt lacks coal tar. In one embodiment, said treated asphalt is darker after step b) than said asphalt of step a). In one embodiment, said mixture is undiluted with solvent. In one embodiment, said biobased esters are selected from the group consisting of soy based esters and canola methyl esters. In one embodiment, said styrene-butadiene complex is derived from tire rubber. In one embodiment, said styrene-butadiene complex is derived from latex rubber. In one embodiment, said monoterpene is D-limonene. In one embodiment, said carbon black pigment is 1200 Carbon Black. In one embodiment, said mixture comprises 27.4% monoterpenes, 33.5% biobased esters, 21.0% propylene glycol methyl ether acetate, 16.9% liquid intermediate made from polystyrene foam, 1.18% styrene-butadiene complex, and 0.02% carbon black pigment. In one embodiment, said mixture comprises 28.1% monoterpenes, 32.8% biobased esters, 21.0% propylene glycol methyl ether acetate, 16.94% liquid intermediate made from polystyrene foam, 1.18% styrene-butadiene complex, and 0.01% carbon black pigment. In one embodiment, said mixture is a surface seal and a penetrating preservation agent to extend the life of the asphalt construction or pavement.

In one embodiment, the invention relates to a composition comprising a mixture comprising at least one biobased ester, at least one monoterpene, propylene glycol methyl ether acetate, a liquid intermediate made from polystyrene foam, carbon black pigment, and styrene-butadiene complex. In one embodiment, said biobased esters are selected from the group consisting of soy based esters and canola methyl esters. In one embodiment, said styrene-butadiene complex is derived from tire rubber. In one embodiment, said styrene-butadiene complex is derived from latex rubber. In one embodiment, said monoterpenes are D-limonene. In one embodiment, mixture comprises 27.4% monoterpenes, 33.5% biobased esters, 21.0% propylene glycol methyl ether acetate, 16.9% liquid intermediate made from polystyrene foam, 1.18% styrene-butadiene complex, and 0.02% carbon black pigment. In one embodiment, mixture comprises 28.1% monoterpenes, 32.8% biobased esters, 21.0% propylene glycol methyl ether acetate, 16.94% liquid intermediate made from polystyrene foam, 1.18% styrene-butadiene complex, and 0.01% carbon black pigment. In one embodiment, said composition is undiluted.

In one embodiment, the invention relates to a method of treating asphalt that is not black in color (e.g. due to aging, exposure to the environment, wear from vehicles, and more typically because it is oxidized) from to a black color comprising: a) providing; i) a solid surface comprising asphalt thereon, wherein at least a portion of said asphalt is not black in color (e.g. because the portion is oxidized); and ii) a mixture comprising at least one biobased ester, at least one monoterpene, propylene glycol methyl ether acetate, a liquid intermediate made from polystyrene foam, carbon black pigment, and styrene-butadiene complex; and b) applying said mixture to said surface under conditions such that said asphalt is colored black. In one embodiment, the asphalt is grey due to aging. In one embodiment, the asphalt is grey due to oxidation. In one embodiment, said asphalt is on a road.

In one embodiment, the invention relates to a method of treating an asphalt on a solid surface comprising: a) providing; i) a solid surface comprising asphalt thereon; and ii) a mixture comprising at least one canola ester, at least one monoterpene, propylene glycol methyl ether acetate, a liquid intermediate made from polystyrene foam, carbon black pigment, and styrene-butadiene complex; and b) applying said mixture to said surface under conditions such that said asphalt is treated.

In one embodiment, the product is used in an undiluted form without the addition of solvents, carriers or other solution.

The product will work as intended on asphalt and asphalt that has been treated with a variety of surface treatments, except coal tar. If there is any coal tar present, the product will not work.

Definitions

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Asphalt is a black bituminous material used for paving roads or other areas; usually spread over crushed rock. Asphalt is also a dark bituminous substance found in natural beds and as residue from petroleum distillation; consists mainly of hydrocarbons. Asphalt is also a mixed asphalt and crushed gravel or sand; used especially for paving but also for roofing.

Asphalts, as used herein, include cementitious materials in which the predominating constituents are bitumens that occur in nature or are obtained in petroleum processing. Bitumen is a term which encompasses cementitious substances, natural or manufactured, composed principally of high molecular weight hydrocarbons, of which asphalts, tars, pitches, and asphaltites are typical. Asphalts are often classified as solids, semisolids, or liquids. They are often defined as the manufactured materials that are produced during petroleum processing. Asphalts characteristically contain very high molecular weight molecular polar species, called asphaltenes, which are soluble in carbon disulfide, pyridine, aromatic hydrocarbons, chlorinated hydrocarbons, and tetrahydrofuran (THF). Asphalts produced from the refining of petroleum have been used primarily in paving and roofing applications.

A preferred rubber is at least a poly(conjugated diene). Exemplary conjugated diene contributed monomer units include 1,3-butadiene, isoprene, 2,3-dimethyl-1,3-butadiene, and 1,3-pentadiene. Preferred conjugated diene contributed monomer units are 1,3-butadiene and isoprene. The rubber may include more than one conjugated diene contributed monomer unit, such as, for example, the rubber may be a poly(1,3-butadiene-co-isoprene).

In addition, the rubber may also contain additional monomer contributed units. Exemplary monomer contributed units include vinyl-substituted aromatic hydrocarbons. Suitable vinyl-substituted aromatic hydrocarbons include styrene, α-methylstyrene, 1-vinylnaphthalene, 2-vinylnaphthalene, 1-α-methyl vinylnaphthalene, 2-α-methyl vinylnaphthalene, as well as alkyl, cycloalkyl, aryl, alkaryl, and aralkyl derivatives thereof, and di- or tri-vinyl aromatic hydrocarbons. A preferred vinyl-substituted aromatic hydrocarbon is styrene. The rubber is preferably any of poly(1,3-butadiene), styrene-butadiene diblock polymers, as well as any styrene-butadiene block or random polymers, and mixtures thereof.

Limonene is a colorless liquid hydrocarbon classified as a cyclic terpene possessing a strong smell of oranges. Limonene has the structure as shown below:

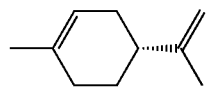

Limonene is a chiral molecule, and biological sources produce one enantiomer: the principal industrial source, citrus fruit, contains D-limonene ((+)-limonene), which is the (R)-enantiomer. Racemic limonene is known as dipentene [1]. D-limonene is commercially available.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$. Similarly, it is contemplated that one or more carbon atom(s) of a compound of the present invention may be replaced by a silicon atom(s). Furthermore, it is contemplated that one or more oxygen atom(s) of a compound of the present invention may be replaced by a sulfur or selenium atom(s).

In structures wherein stereochemistry is not explicitly indicated, it is assumed that either stereochemistry is considered and both isomers claimed.

The term "effective," as that term is used in the specification and/or claims, means adequate to accomplish a desired, or hoped for result.

The term "undiluted," as that term is used in the specification and/or claims, means that no additional solvent has been added.

An "isomer" of a first compound is a separate compound in which each molecule contains the same constituent atoms as the first compound, but where the configuration of those atoms in three dimensions differs.

The term "oleic acid," as that term is used to refer to a fatty acid that occurs naturally in various animal and vegetable fats and oils. It is an odorless, colorless oil, although commercial samples may be yellowish. In chemical terms, oleic acid is classified as a monounsaturated omega-9 fatty acid, abbreviated with a lipid number of 18:1 cis-9. It has the formula $CH_3(CH_2)_7CH=CH(CH_2)_7COOH$.

The term "biobased esters," as that term is used to refer to esters that are a biproduct of cultivation from living organisms, either in terms of microbial, plant, or animal based bioesters. Examples of these include soy based esters, coconut, palm, canola and rapeseed oils, recycled vegetable oils, and beef tallow. Esters are made through a chemical process called transesterification. "Biobased esters" naturally contain a variety of chain lengths.

DETAILED DESCRIPTION OF THE INVENTION

In the past, it has been a common practice to recondition a worn asphalt surface by a hot application of a new mat of asphaltic material over the existing surface to form a new flat surface. This application of new material raises the general level of the asphalt surface by 1 inch to 1½ inches. The problem with such an application of new material is that after a few years, and the surface has been reconditioned four or five times, the new surface is 5 inches to 9 inches higher than the old original surface. This raised surface level can be an especially serious problem, especially now where the roadway is at a higher level than the adjoining gutters or sidewalks. Each time a roadway is resurfaced by using overlay procedures reduces overhead room of underpasses. Where overlaying is done across bridges, each overlay applied to the bridge adds to the dead weight that the bridges must carry thereby diminishing the amount of vehicular weight that the bridge is able to carry with safety.

A more recent practice has been to recondition old asphalt surfaces by breaking up of the existing asphalt aggregate material, picking up the material for reconditioning, heating and then reapplying the heated reconditioned material as a new surface. The pavement is heated, scarified to a certain depth by a scarifying tool producing loose aggregate material. This loose aggregate material is then picked up, placed within a mixing vat where it is pulverized, combined with a light oil and then reapplied to the asphalt material.

This past method of recycling of the old asphalt has a disadvantage that it requires picking up of the old asphalt, moving it to a mixing location and then bringing it back and reapplying it to the roadway. It would substantially diminish the cost of resurfacing an asphalt roadway or pavement if this recycling procedure did not require the physical picking up of the loose aggregate material and transporting such to a mixer and then retransporting it back to be applied to the asphalt surface. What is needed is a method of resurfacing or improving the asphalt surface without physical removal of the asphalt or application of additional roadway layers.

Asphalt road pavements are being subjected to increasingly severe load stress. The repeated deflection of the road pavement causes elastic-type failure and fatigue failure in the pavement, which manifests itself in the form of pavement surface cracking and fracturing patterns. Conventional repair methods involve asphalt overlays, or replacement of the pavement surface.

A variety of paving grade asphalt compositions have been developed for the purpose of providing improved physical and mechanical properties in pavements under heavy traffic loads. Illustrative of these developments are the asphalt compositions disclosed in U.S. Pat. Nos. 2,871,212 [2]; 3,338,849 [3]; 3,374,104 [4]; 3,821,144 [5]; 3,879,323 [6]; 4,105,612 [7]; and the like.

Also of increasing importance for reasons of economy and convenience are methods and materials for repairing and surfacing broken or used asphalt pavements. An important objective has been the development of materials for repair of asphalt pavements which exhibit increased flexibility and resistance to fatigue failure. Efforts to provide asphaltic binder materials with the desired elastomeric properties for asphalt pavement repair are typified by the technology of U.S. Pat. Nos. 2,310,972 [8]; 2,700,655 [9]; 3,049,836 [10]; 3,253,521 [11]; 3,270,631 [12]; and 3,340,780 [13].

Bituminous products are widely used in the construction field, and constitute one of the major commodity products in building and road construction. These materials are derived from the residue remaining after crude oil is refined to remove various distillates. Over the past twenty years, there have been many innovations in bituminous materials used in roofing and paving. The principle objectives of these developments are to increase strength and durability, ductility, reduce "creep", cracking, and surface wear. A typical asphalt shingled roof requires replacement after 12-18 years, and road damage to asphalt may be detected within even the first year of paving. New compositions have substantially extended the lifespan of these materials Many of the new asphalt materials contain synthetic polymers to create chemical links (both covalent and non-covalent interactions) between the long chain hydrocarbons, thus providing molecular strength. U.S. Pat. No. 5,556,900 [14] discloses a thermoplastic polymer-linked asphalt in which the asphalt is reacted with an epoxide polymer resulting in a composition with low gelation, high emulsion forming capacity, and improved rheology. Heat treatment at 135° C., results in covalent bonding between the polymer and the asphalt. In other polymer-containing bitumens, there is typically non-covalent adhesion binding of components.

For example, U.S. Pat. No. 5,473,000 [15] teaches a method for improving bitumen by adding to asphalt a thermoplast or thermoelastomer, and a wood resin, resulting in enhanced binding properties. A linear polyethylene modified asphaltic composition is disclosed in U.S. Pat. No. 4,868,233 [16], which has improved storage stability and creep resistance. Another polymer additive approach is disclosed in U.S. Pat. No. 5,322,867 [17] for a bituminous mixture containing a polymer comprising one block of a conjugated diolefin methacrylate and a block of a functionalized acrylic monomer, giving improved properties over neat asphalt.

Some of the most significant developments in asphalt and tar composition involve various strategies for combining the strength and resiliency of latex polymers with bituminous materials. U.S. Pat. Nos. 4,485,201 [18] and 5,436,285 [19] disclose incorporation of finely divided rubber into asphalt compositions. In a variation, U.S. Pat. No. 5,811,477 [20] utilizes reclaimed rubber particles, latex rubber, preferably styrene butadiene, and an aqueous asphalt emulsion to achieve low temperature processing, thereby reducing environmental contamination from latex volatiles.

U.S. Pat. Nos. 5,451,621 [21] and 5,973,037 [22] teach the infusion of particular latex polymers characterized as styrene-ethylene-butylene-styrene block copolymers into bituminous products, including asphalt, to raise the softening point of the blend and increase resistance to ultraviolet radiation, ozone, and fatigue. In yet another application of rubber in the asphalt art, U.S. Pat. No. 5,704,971 [23] discloses the pretreatment of crumb rubber with peroxide, adding the treated rubber to asphalt in the presence of a compatibilized binder to produce an asphalt having improved settling properties of the binder, and reduced tendency to ravel.

While the objectives of improved durability, ductility, strength, and other related performance improvements, modification of bituminous substances has brought about new problems. The same molecular interactions which achieve enhanced stability and binding efficiency of the asphalt components, especially in the class of latex polymer blends known as SuperPave, also render the material extremely difficult to remove from paving equipment such as asphalt distributors and oilers, spreaders and the like, roofing manufacturing equipment and applications equipment. The buildup of these materials on equipment, particularly painted and bare metallic surfaces, leads to uneven dispensing, plugged nozzles, and impaired release of asphalt from distributors and spreaders. In many instances uneven distribution of asphalt in pavement requires repaving at substantial cost to the industry.

Classically, equipment has been cleaned by the use of common petroleum distillates such as kerosene, diesel fuel, or more purified fractions, and wood resin compounds such as turpentine. Usually cleaning with these substances requires mechanical intervention as by brushing, rubbing with cloth or abrasives Use of such conventional substances has led to environmental contamination and exposure of cleanup personnel to toxic, and even carcinogenic substances. Moreover, the extreme intractability of the advanced polymer blended bitumens to conventional cleaning solvents increases the volumes needed to soften and remove them from machinery surfaces. Incomplete removal of the asphalt results from the difficulty of conventional solvents to penetrate the asphalt matrix. This increases costs of cleanup to the industry, in terms of time and materials, and machine efficiency.

In one embodiment, the invention relates to a thin biobased liquid applied on the surface of asphalt pavement which functions as both a surface seal and a penetrating preservation agent which extends the life of the pavement. In one embodiment, the invention relates to the asphalt preservation agent described in Table 1 and Example 1. In one embodiment, the invention relates to the asphalt preservation agent described in Table 2 and Example 2. In one embodiment, this material seeks out the air voids in the pavement carrying the material deep into the asphalt matrix. The average depth of penetration is 2-5 cm reversing the oxidation on the asphalt surface and in the matrix. The material contains SBS polymers, and SBBS polymers derived from the recovery and reuse of polystyrene and used tire rubber, or SBS and SBBS polymers made from vegetable oil derivatives. The combination of the reduction chemistry and introduction of new polymers serve to rejuvenate and strengthen the existing asphalt matrix. The liquid is free of any petroleum oils or petroleum byproducts.

All asphalt starts oxidizing the moment it is made. Visually, you can observe this when you compare new asphalt pavement versus asphalt that is 3-6 months old. New asphalt is black and the older asphalt turns grey. As the asphalt ages it becomes lighter with age. The new formulation was created to provide the features and benefits of our conventional product with a significant advantage of being able to rejuvenate the asphalt and keep the desirable aesthetics of a new pavement, i.e. change the lighter color (from aging) back to black.

This product comprises new formulations which provides a darker, almost black surface once it cures versus the conventional RePlay which, when cured, is a clear, slightly darker surface. The aesthetic differences are dramatically different; however, the functional performance of both products are the same. Both formulations penetrate into the asphalt to a depth of ¾"-1¼" in 15 to 30 minutes while reversing the oxidation present on the asphalt binder. Both impart new nanopolymers to the asphaltic matrix, thus strengthening the pavement and returning it back to a functional 95% of new level; however, the new product adds one additional polymer to the matrix which keeps the treated asphalt much darker, down to the ¾-1¼" depth.

Conventional RePlay derives the carbon based nanopolymers from the soybean oil derivatives. Soybean oil, or soy methyl esters are reacted to form these nanopolymers. This is combined with a polystyrene based solution made to produce the "superpave nanopolymers" and a "super superpave" copolymer which, when applied to asphalt, strengthens and extends the use life of the pavement. Chemically, these are described as styrene-butadiene-styrene (identified as S-B-S, or Superpave) and our new styrene-butadiene-butadiene-styrene or S-B-B-S. (this new copolymer was evaluated at the National Center for Pavement Technology, where they reported a significant improvement over S-B-S in asphalt binders.)

The product formulations make use of these polymers plus the addition of a lampblack/styrene-based polymer which provides a significantly blacker result which penetrates deep into the asphalt. The purpose is to create a lasting dark pavement which offers significantly better aesthetics than conventionally treated asphalt which lightens in color over time due to the oxidation of the asphalt binder. The addition of the new polymer masks the oxidation. In addition, it was discovered that one could achieve the same results with esters made from canola oil, and combinations with both soy and canola. Note that using straight soybean oil or canola oil on asphalt is very destructive, but when they are reacted with our chemistries, both add strength and durability to asphalt pavements.

Both the new and existing formulation are applied in the same way. The solution is applied to the asphalt surface using a spray system which meters out the exact amount to be applied. All the solutions seek out the voids (holes in the pavement) and penetrate into the asphalt matrix. Asphalt has approximately 11-15% voids. While the solution is penetrating, a series of reduction reactions take place on the surface and in the matrix reversing the oxidation and providing a bonding spot for the new nanopolymers to bond to the asphalt binder. The chemical reactions are endothermic reactions, becoming colder. No heat is needed for this to occur.

As part of the chemistries involved, a liquid intermediate is created from polystyrene foam. This compound is made by reacting polystyrene foam with a d-limonene/soy methyl ester solution using sulfuric acid to trigger the reaction and stabilize the pH, referred hereafter as "Phloem" or "a liquid intermediate made from polystyrene foam." The d-limonene/soy methyl ester solution is prepared in a radio of 70 to 30 by mass. A ratio of sulfuric acid to the soy methyl ester is 999.9 to 0.0001 by mass is required to trigger the reaction and stabilize the pH. Polystyrene foam is added to the d-limonene/soy methyl ester solution until a specific gravity of 0.91 is reached (pH 4.5-5.5) in order to create the liquid intermediate "Phloem." Phloem is created by reacting the polystyrene foam with the d-limonene/soy methyl ester with sulfuric acid utilizing a catalyst. The catalyst comprises iron (steel tank), copper, and a nickel/silver alloy. When the reaction is run with just the iron and copper, it does not work. When the reaction is run with just the nickel or nickel/silver alloy by itself, it does not work. The combination of the three catalysts enables catalysis of the reaction. The solution is monitored to achieve a specific gravity of 0.910 and a pH of 4.5 to 5.5.

A second intermediate is made to produce a styrene, butadiene complex. Used tire rubber which has been shredded or ground up is reacted with concentrated sulfuric acid, in the presence of propylene glycol monomethyl ether acetate, or PMA. This produces a styrene-butadiene complex which provides the source material for the butadiene, or latex rubber. Virgin latex rubber works the same as used tire rubber.

It is believed that the styrene/butadiene complex provides the necessary amount of butadiene to make S-B-S and the SBBS polymers. Butadiene is the building block for rubber. It is 4 isoprene units and that makes latex rubber. Rubber can also be derived from used tires. The styrene/butadiene complex is made from tires which are shredded or ground. The shredded rubber is treated with PMA (propylene glycol monomethyl ether acetate) and once the rubber is softened, the reaction is initiated with sulfuric acid. It is believed that the result is that one is able to extract styrene-butadiene which becomes building block for the SBS AND THE SBBS Nanopolymers. This styrene-butadiene is added to the formulations to provide better skid resistance and better longevity. It is believed that this is one of the reasons why the formulations work as well as they do.

The reaction is almost immediate and produces heat. Some sulfamic acid is formed which gets neutralized by the PMA. The tire rubber is broken down and the components captured. When the reaction is run, it smells like a rubber plant. The acid may be recovered and reused multiple times.

One source of the polymerized lampblack is Cabot, Corporation, Boston, Mass. In the non-limiting example provided herein, 'Emperor 1200 carbon black" is used. This provides the bulk of the darkening agent to both new formulations. It is believed that black, carbon based nanopolymers are also created when the methyl esters are reacted with the other raw materials.

Our carbon based "black polymers" used in the formulations may be derived from either carbon black, lamp black (the soot from burning organics), or charcoal (derived from combustion of wood or cellulose). All of these sources produce a pure carbon which is linked to the styrene on either end of the carbon chain. As oleic acid contains 18 carbon atoms and the higher the oleic content in either oil, the more carbon based black polymers. The structure lends itself to a substitution of styrene on either end of the carbon chain which makes the black polymer used in the formulation. In some embodiments, they form nanopolymers. In some embodiments, the presence of the styrene on the ends lends itself to crosslinking of the polymer chains which attach to the asphaltic base. In some embodiments, there is chemical attachment and it is not simply a physical coating. In some embodiments, this bonding provides longevity of the black appearance as well as helping increase the longevity of the overall pavement.

Although not limiting the present invention, it is believed that the higher the oleic acid content, the more "black nano polymer" development. Although not limiting the present invention, it is believed that the other end of the styrene bonds to isoprene units (4 of them) which make up latex rubber. Although not limiting the present invention, it is believed that provides longevity and increased skid resistance.

EXAMPLES

The following examples are provided in order to demonstrate and further illustrate certain preferred embodiments and aspects of the present invention and are not to be construed as limiting the scope thereof.

Example 1

Solution "A" with Soybean Derivatives
The raw materials MUST be added in sequence for either solution to work, and be stable.

TABLE 1

A Method of Manufacture for Solution A follows.

| Ingredient | % by weight |
| --- | --- |
| d-limonene | 27.4 |
| soy methyl esters | 33.5 |
| Propylene glycol methyl ether acetate (PMA) | 21.0 |
| Phloem (liquid intermediate made from polystyrene foam) | 16.9 |
| styrene/butadiene complex | 1.18 |
| Emperor 1200 Carbon Black | 0.02 |
| Total | 100 |

Method of Manufacture
1. Mix Emperor 1200 Carbon Black into the soy methyl esters. Use high shear mixing and heat the solution to 110-120° F. for 30 minutes.
2. Combine d-limonene, soy methyl esters/carbon black solution, and PMA into large reactor. Add 80% of Phloem (liquid intermediate made from polystyrene foam) and styrene/butadiene complex. Mix for 30 minutes.
3. Check specific gravity and add the balance of the Phloem (liquid intermediate made from polystyrene foam) to reach desired specific gravity of 0.889-0.891
4. Mix for 30 minutes and take sample to QC lab.

The curing time is slightly longer for the black products and will be affected by the ambient temperature. The formulation should not be applied to asphalt pavement temperatures below 40° F. When pavement temperatures fall below 60° F., add an extra 15 minutes cure time for every 5 degree drop due to increased viscosity and pavement shrinkage.

Example 2

Solution "B"—with Canola Methyl Esters
The raw materials MUST be added in sequence for either solution to work, and be stable.

TABLE 2

A Method of Manufacture for Solution B follows.

| Ingredient | % by weight |
| --- | --- |
| d-limonene | 28.1 |
| Canola Methyl esters | 32.8 |
| Propylene glycol methyl ether acetate (PMA) | 21.0 |
| Phloem (S.G. 0.910) (liquid intermediate made from polystyrene foam) | 16.94 |
| styrene/butadiene complex | 1.18 |
| Emperor 1200 Carbon Black | 0.01 |
| Total | 100 |

Method of Manufacture
1. Combine carbon black with Canola Methyl esters. Mix under high shear at a temperature of 120-130° F.
2. Mix for 30 minutes
3. The rest of the method is the same as "solution A".

The specific gravity of the finished product is 0.889-0.891. Adjust with phloem.

The curing time is slightly longer for the black products and will be affected by the ambient temperature. The formulation should not be applied to asphalt pavement temperatures below 40° F. When pavement temperatures fall below 60° F., add an extra 15 minutes cure time for every 5 degree drop due to increased viscosity and pavement shrinkage.

REFERENCES

1. Simonsen, J. L. (1947) *The Terpenes*, Vol. 1, 2nd ed., Cambridge University Press.
2. Thayer, C. H. "Asphalt Composition Containing Polyethylene," U.S. Pat. No. 2,871,212, (issued Jan. 27, 1959).
3. Johnson, T. A. "Incorporation of Reclaimed Rubber into Asphalt," U.S. Pat. No. 3,338,849, (issued Aug. 29, 1967).
4. Baum, L. A. H. and Leonard, H. "Asphalt Compositions and Process for Preparing Same," U.S. Pat. No. 3,374,104, (issued Mar. 19, 1968).
5. Goyer, A. and Smadja, R. "Asphaltic Compositions," U.S. Pat. No. 3,821,144, (issued Jun. 28, 1974).
6. Van Der Loos, J. L. M. "Process for Preparing a Mixture of Bitumen, a High-Boiling Hydrocarbon and a Rubber- Like Copolymer of Ethylene, at Least One Other Alpha-Alkene and, If Necessary, One or More Polyenes," U.S. Pat. No. 3,879,323, filed Sep. 18, 1973. (issued Apr. 22, 1975).
7. Cushman, D. R. et al. "Asphalt Composition and Its Manufacture," U.S. Pat. No. 4,105,612, filed Jun. 3, 1977. (issued Aug. 8, 1978).
8. Livermore, H. J. et al. "Rubber and Asphalt Dispersion Cement," U.S. Pat. No. 2,310,972, (issued Feb. 16, 1943).
9. Endres, H. A. et al. "Rubber Compositions," U.S. Pat. No. 2,700,655, (issued Jan. 25, 1955).
10. Eugene, W. "Roofing Repair Patch," U.S. Pat. No. 3,049,836, (issued Aug. 21, 1962).
11. Endres, H. A. "Flexible Paving Composition," U.S. Pat. No. 3,253,521, (issued May 31, 1966).
12. Bower, H. C. "Method of Applying Seal Coat Paving Mixtures," U.S. Pat. No. 3,270,631, (issued Sep. 6, 1966).
13. Roediger, J. C. "Construction of Asphalt Overlays on Rigid Concrete Pavements," U.S. Pat. No. 3,340,780, (issued Sep. 12, 1967).
14. Goodrich, J. L. and Statz, R. J. "Process for Producing a Polyepoxy Polymer-Linked-Asphalt Thermoplastic Composition," U.S. Pat. No. 5,556,900, filed Nov. 10, 1994. (issued Sep. 17, 1996).
15. Pinomaa, O. L. "Method for Improving the Strength of Bitumen, Asphalt or a Similar Material, and a Composition Obtained by the Method," U.S. Pat. No. 5,473,000, filed Nov. 18, 1992. (issued Dec. 5, 1995).
16. Moran, L. E. "Polyethylene Modified Asphalts," U.S. Pat. No. 4,868,233, filed Jul. 15, 1987. (issued Sep. 19, 1989).
17. Kluttz, R. Q. "Asphalt Amine Functionalized Polymer Composition," U.S. Pat. No. 5,322,867, filed Aug. 12, 1993. (issued Jun. 21, 1994).
18. Davis, F. R. "Method of Modifying Asphalt with Thermoplastic Polymers, Ground Rubber and Composition Produced," U.S. Pat. No. 4,485,201, filed Nov. 21, 1983. (issued Nov. 27, 1984).
19. Causyn, D. and Thys, K. "Recycled Rubber in a Polymer Modified Asphalt and a Method of Making Same," U.S. Pat. No. 5,436,285, filed Jul. 26, 1993. (issued Jul. 25, 1995).
20. Burris, M. V. and Burris, B. B. "Method for Preparing Improved Asphalt Emulsion Compositions," U.S. Pat. No. 5,811,477, filed Jul. 26, 1996. (issued Sep. 22, 1998).
21. Usmani, A. M. et al. "Sbs-Modified, Asphalt-Based Material with Resistance to Crosslinking," U.S. Pat. No. 5,451,621, filed Aug. 15, 1994. (issued Sep. 19, 1995).
22. Fields, J. R. "Styrene Ethylene Butylene Styrene (Sebs) Copolymer Rubber Modified Asphalt Mixture," U.S. Pat. No. 5,973,037, filed Nov. 25, 1997. (issued Oct. 26, 1999).
23. Memon, M. "Homogeneous Crumb Rubber Modified Asphalt," U.S. Pat. No. 5,704,971, filed Mar. 4, 1997. (issued Jan. 6, 1998).

I claim:

1. A method of treating an asphalt from a solid surface comprising;
   a) providing;
      i) a solid surface comprising asphalt thereon; and
      ii) a mixture comprising at least one biobased ester, at least one monoterpene, propylene glycol methyl ether acetate, a liquid intermediate made from polystyrene foam, carbon black pigment, and styrene-butadiene complex; and
   b) applying said mixture to said solid surface.
2. The method of claim 1, wherein the mixture is a non-aqueous mixture.
3. The method of claim 1, wherein said asphalt lacks coal tar.
4. The method of claim 1, wherein said treated asphalt is darker after step b) than said asphalt of step a).
5. The method of claim 1, wherein said mixture is undiluted with solvent.
6. The method of claim 1, wherein said biobased esters are selected from the group consisting of soy based esters and canola methyl esters.
7. The method of claim 1, wherein said styrene-butadiene complex is derived from tire rubber.
8. The method of claim 1, wherein said styrene-butadiene complex is derived from latex rubber.
9. The method of claim 1, wherein said monoterpene is D-limonene.
10. The method of claim 1, wherein said carbon black pigment is 1200 Carbon Black.
11. The method of claim 1, wherein said mixture comprises 27.4% monoterpenes, 33.5% biobased esters, 21.0% propylene glycol methyl ether acetate, 16.9% liquid intermediate made from polystyrene foam, 1.18% styrene-butadiene complex, and 0.02% carbon black pigment.
12. The method of claim 1, wherein said mixture comprises 28.1% monoterpenes, 32.8% biobased esters, 21.0% propylene glycol methyl ether acetate, 16.94% liquid intermediate made from polystyrene foam, 1.18% styrene-butadiene complex, and 0.01% carbon black pigment.
13. The method of claim 1, wherein said mixture is a surface seal and a penetrating preservation agent to extend the life of the asphalt.
14. A method of treating oxidized asphalt comprising;
   a) providing;
      i) a solid surface comprising asphalt thereon, wherein at least a portion of said asphalt is oxidized; and
      ii) a mixture comprising at least one biobased ester, at least one monoterpene, propylene glycol methyl ether acetate, a liquid intermediate made from polystyrene foam, carbon black pigment, and styrene-butadiene complex; and
   b) applying said mixture to said solid surface.
15. A method of treating an asphalt from a solid surface comprising;
   a) providing;
      i) a solid surface comprising asphalt thereon; and
      ii) a mixture comprising at least one canola ester, at least one monoterpene, propylene glycol methyl ether acetate, a liquid intermediate made from polystyrene foam, carbon black pigment, and styrene-butadiene complex; and
   b) applying said mixture to said solid surface.
16. The method of claim 15, wherein said mixture is a surface seal and a penetrating preservation agent that extends the life of the asphalt.
17. The method of claim 16, wherein said asphalt is on a road.

* * * * *